US009878502B2

(12) United States Patent
Helfrich et al.

(10) Patent No.: US 9,878,502 B2
(45) Date of Patent: Jan. 30, 2018

(54) DEVICE AND METHOD FOR PROCESSING A FIBRE COMPOUND STRUCTURE

(71) Applicant: AIRBUS OPERATIONS GMBH, Hamburg (DE)

(72) Inventors: Felix Caspar Helfrich, Hamburg (DE); Hans Marquardt, Fredenbeck (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 0 days.

(21) Appl. No.: 15/257,024

(22) Filed: Sep. 6, 2016

(65) Prior Publication Data
US 2017/0021576 A1    Jan. 26, 2017

Related U.S. Application Data

(62) Division of application No. 12/601,417, filed as application No. PCT/EP2008/057010 on Jun. 5, 2008, now Pat. No. 9,463,599.

(Continued)

(30) Foreign Application Priority Data

Jun. 5, 2007    (DE) ......................... 10 2007 026 099

(51) Int. Cl.
*B29C 70/00*    (2006.01)
*B29C 35/00*    (2006.01)
(Continued)

(52) U.S. Cl.
CPC .............. *B29C 70/44* (2013.01); *B29C 35/12* (2013.01); *B29C 73/10* (2013.01); *B29C 73/12* (2013.01);
(Continued)

(58) Field of Classification Search
CPC ......... B29C 70/00; B29C 70/40; B29C 70/44; B29C 35/00; B29C 35/10; B29C 35/12;
(Continued)

(56) References Cited

U.S. PATENT DOCUMENTS 2,825,930 A    11/1954  Gaillard
3,553,779 A     1/1971  Miller
(Continued)

FOREIGN PATENT DOCUMENTS

DE          850 805       9/1952
EP         1 281 504      2/2003
(Continued)

OTHER PUBLICATIONS

German Office Action from German Patent Office issued in the priority German patent application 10 2007 026 099.9 dated Jun. 8, 2011 (5 pages).

(Continued)

*Primary Examiner* — Jacob T Minskey
*Assistant Examiner* — Matthew Hoover
(74) *Attorney, Agent, or Firm* — Greer, Burns & Crains, Ltd.

(57) ABSTRACT

In a method for processing a fiber compound structure, an unhardened fiber layer is arranged on a surface section of the fiber compound structure. A pressure cushion is arranged above the surface section. The pressure cushion has a pressure cap and a pressure-tight cap mat pressure-tightly connected to a circumferential border of the pressure cap such that the cap mat limits a pressure area together with the pressure cap. An overpressure in the pressure area is generated. The pressure cushion is pressed onto the fiber compound structure such that the overpressure presses the cap mat against the fiber layer while supporting the fiber compound structure on a side of the fiber compound structure (Continued)

that is opposed to the surface section. The fiber layer is hardened

5 Claims, 8 Drawing Sheets

Related U.S. Application Data

(60) Provisional application No. 60/933,300, filed on Jun. 5, 2007.

(51) Int. Cl.
| | | |
|---|---|---|
| *B29C 73/00* | (2006.01) | |
| *B29C 70/44* | (2006.01) | |
| *B29C 73/12* | (2006.01) | |
| *B29C 73/32* | (2006.01) | |
| *B29C 35/12* | (2006.01) | |
| *B29C 73/10* | (2006.01) | |
| B29K 307/00 | (2006.01) | |
| B29K 307/04 | (2006.01) | |
| B29L 31/30 | (2006.01) | |

(52) U.S. Cl.
CPC .......... *B29C 73/32* (2013.01); *B29K 2307/00* (2013.01); *B29K 2307/04* (2013.01); *B29L 2031/3076* (2013.01); *Y02T 50/433* (2013.01)

(58) Field of Classification Search
CPC ......... B29C 73/00; B29C 73/10; B29C 73/12; B29C 73/30; B29C 73/32; B29C 65/00; B29C 47/76; B29C 45/00; B29C 47/00; B29C 39/02; B29C 43/02; B29C 49/00; B29C 51/00; B29C 39/14; B29C 55/06; B29C 67/20; B29C 43/10; B29C 55/28; B28B 1/26; B28B 37/00; B28B 15/00; B28B 11/08; B28B 21/36; B28B 11/00; B29D 22/00; B29D 24/00; B29D 29/00; B29D 7/00; A01J 21/00; A01J 25/12; A21C 3/00; A21C 11/00; A23G 1/20; A23G 3/02; A23P 1/00

See application file for complete search history.

(56) References Cited

U.S. PATENT DOCUMENTS

| | | | |
|---|---|---|---|
| 3,837,965 | A | 9/1974 | Mahon et al. |
| 5,338,117 | A | 8/1994 | Kucksdorf et al. |
| 5,846,362 | A | 12/1998 | Chung |
| 5,978,183 | A | 11/1999 | Hsiao et al. |
| 6,435,242 | B1 * | 8/2002 | Reis ........................ B29C 73/12 156/382 |
| 7,052,572 | B2 * | 5/2006 | Miura .................... B29C 43/10 156/286 |

FOREIGN PATENT DOCUMENTS

| | | |
|---|---|---|
| FR | 2 705 914 | 12/1994 |
| GB | 2 267 457 | 12/1993 |

OTHER PUBLICATIONS

European Office Action issued in co-pending European patent application 08 760 586.1 dated Nov. 22, 2010 (5 pages).

\* cited by examiner

DEVICE AND METHOD FOR PROCESSING A FIBRE COMPOUND STRUCTURE

CROSS-REFERENCE TO RELATED APPLICATIONS

This Application is a divisional application of co-pending U.S. application Ser. No. 12/601,417, filed on May 7, 2010, which is an application filed under 35 U.S.C. § 371 of PCT/EP2008/057010, filed Jun. 5, 2008, the entire disclosures of which are herein incorporated by reference. This Application also claims the benefit of U.S. Provisional Application No. 60/933,300, filed Jun. 5, 2007 and German Patent Application No. 10 2007 026 099.9, filed June 5, 2007, the entire disclosures of which are herein incorporated by reference.

FEDERALLY SPONSORED RESEARCH OR DEVELOPMENT

N/A

TECHNICAL FIELD

The present invention relates to a method for processing a fibre compound structure, particularly a structure made from carbon fibre reinforced plastics (CFRP). Moreover, the invention relates to a connecting device for connecting an unhardened fibre layer to a fibre compound structure.

BACKGROUND

While being applicable to arbitrary fibre compound structures the present invention as well as the underlying problem is explained in more detail with regard to carbon fibre reinforced plastic components of an aeroplane structure.

For weight reduction reasons the components of aeroplanes are increasingly made of fibre compound materials, particularly made of carbon fibre reinforced plastics (CFRP). Thereby they comprise a structure of multiple layers of fibre lay-up which are connected to each other by means of a hardened resin matrix, particularly an epoxy resin matrix. For producing such components according to conventional methods multiple layers of impregnated fibre lay-ups are placed in a laminating device. Subsequently the resin matrix is hardened, for instance by exposure to elevated temperature and elevated pressure.

According to a conventional method a component is enclosed in a bag of pressure-tight foil whose interior is evacuated by means of a vacuum pump. Such enclosed component is then inserted into an autoclave where it is exposed to elevated pressure.

The published patent application US2007/0080481 describes a method for producing fibre compound components in which an expansion element together with compound material is inserted into a closable container. The container is closed and the expansion element is exposed to overpressure which presses the compound material against an outer wall of the container.

In case of rectification work on such fibre compound components, e.g. for correcting defects, for repairing damages or for modifying the components, in a conventional working process preimpregnated fibre layers (prepregs) are fixed by means of an adhesive tape on the surface to be processed of the component and are covered with a pressure-tight membrane as for instance a vacuum bag. The area enclosed under the membrane is evacuated and the component is inserted in to an autoclave where it is exposed to elevated pressure for hardening.

Here the problem arises that also for small, locally bounded rectification works of a component an autoclave has to be provided which is big enough to accommodate the whole component. This results in considerable costs, particularly for relatively big components as for instance fuselage shells or stiffening elements of fuselages, which multiply if erroneous rectification works have to be repeated. If present, sufficiently big dimensioned autoclaves are occupied for other purposes time gets lost due to waiting. Another drawback is that in most cases the components have to be reinserted into the device in which they were manufactured during the hardening in the autoclave. During the rectification work the device is not available for the production run. Also, in case of rectification works on mounted assemblies these cannot be inserted into the autoclave if they are too big or if they contain parts as for instance electric installations which would be damaged by high pressures.

If the fibre layers are hardened without application of an autoclave and if thereby merely the area enclosed under the membrane is evacuated the fibre layers are exposed to a maximal pressure difference between inner pressure and outer pressure of 0.8-0.9 bar. Under these pressure conditions adhesive films tend to pore generation which worsens the stability of the components and leads to error displays during an ultrasonic inspection which is required for a quality check.

DE 40 19 744 A1 discloses rubber stamps for applying pressure during repair work of fibre compound structures. However, due to the locally uneven pressure distribution an application of such mechanical clamping elements regularly leads to an uneven thickness of the hardened fibre layers and therefore to an insufficient precision of rectification works. Further, DE 40 19 744 A1 also discloses to place a bell-shaped top over a membrane that covers a repair location, and then to exert overpressure within the bell-shaped top upon the repair location. However, since the overpressure leads to forces that tend to drive the bell-shaped top and the membrane away from each other, it is difficult to reliably seal the contact line between the bell-shaped top and the membrane. Furthermore, the method cannot be applied in cases where covering the repair location with a foil or membrane is not desired.

SUMMARY

Therefore, it is an object of the present invention to provide a reliable method for processing a fibre compound structure which allows for connecting unhardened fibre layers to the fibre compound structure without application of an autoclave while guaranteeing high material quality and precision.

According to the present invention this object is achieved by a connecting device for connecting an unhardened fibre layer which is arranged on a surface section of a fibre compound structure to the fibre compound structure comprising the features of claim 1, as well as a processing method for processing a fibre compound structure including the features of claim 14.

The basic idea of the present invention is to provide a raised pressure within a pressure region which is limited by a pressure cap and by a pressure-tight cap mat that are connected together to form a pressure cushion, wherein said pressure presses the cap mat against the fibre layer which is arranged on a surface section of the fibre compound structure. This allows for applying a surface pressure through the membrane onto to the fibre layer, such as the pressure being applied onto the unhardened fibre layers for instance during conventional methods within a heating press, and causes therewith a hardening of the fibre layer. As the pressure is applied evenly a precise, even thickness of the fibre layer results after the hardening.

Because the pressure cap and the cap mat are connected to each other in the form of a pressure cushion, the pressure area is enabled to be reliably sealed, independently of the geometrical shape of the surface section, and independently of whether the surface section is covered by an airtight foil or membrane. Furthermore, the handling of the device is simple and efficient because the connecting device can be moved to a different surface section without having to disrupt the sealing of the pressure area.

Thereby it is a particular advantage that no container enclosing the whole fibre compound structure such as for instance an autoclave is required. The pressure cap being applied has to be only that big that it can be arranged over the surface section which is covered by the fibre layer, which is as big as the fibre layer or only insignificantly bigger. This advantage is especially relevant where details of big structures are to be processed for instance on an aeroplane fuselage, on an empennage planking or on a flap shell. Workings on mounted assemblies are also smoothly feasible, with pressure sensitive components lying outside the processed section not being endangered. Merely the geometric preconditions for positioning and securing the pressure cap and if necessary a counter bearing have to be fulfilled.

Because expensive and frequently only limitedly available capacities in big autoclaves and the lamination devices used for series production are not required the processing method according to the present invention is not only exceptionally cost-effective but also fast because dead times during the usage of big autoclaves and of the series devices are omitted. Because the connecting device according to the present invention is small, cost-efficient and simple to assemble, several such devices can be applied simultaneously or consecutively at different processing positions of a structure thereby further increasing the advantage in time. Moreover, the invention can also be applied where an autoclave is not available for instance during the repair of aeroplanes.

Advantageous embodiments and improvements of the invention are found in the depending claims.

In compliance with a preferred embodiment of the connecting device according to the present invention, the pressure cap and the cap mat of the pressure cushion are integrally formed from an elastic material. This achieves a highly reliable sealing of the pressure area and makes the device both cost-efficient to manufacture and easy to handle.

According to a preferred embodiment, the pressure cushion further comprises a sealing area for touching the fibre compound structure along a line that encircles the surface section. This enables the formation of a hermetically sealed area between the cap mat and the fibre compound structure that can be evacuated without having to cover the surface section with an airtight membrane or foil. In consequence, handling is further facilitated.

According to a preferred embodiment, the pressure cushion further comprises a recess that is surrounded by the sealing area. In this way, the recess can accommodate fibre layers even if these are significantly raised in an uncompressed state above the surface level of the fibre compound structure. Preferably, further an evacuation means is provided for evacuating a low pressure area delimited by the cap mat, the fibre compound structure and the sealing area. In this way, the handling of an external evacuation device can be dispensed with.

According to a preferred embodiment the cap mat is provided in a semi-rigid form. This allows for leaving a distance between the pressure cap and the fibre compound component whereby the device can be applied to variably shaped, for instance bent surface sections of the fibre compound structure. Preferably the cap mat comprises a bigger stiffness in a border section than in a middle section. In this manner the cap mat adapts in its middle section, which for instance comes into contact with a membrane above the fibre compound structure, flexibly to the shape of the surface section, while the bigger stiffness of the border sections which do not come into contact with the fibre compound structure impedes inflating of the border sections by means of the overpressure.

Preferably the cap mat is provided in such a manner according to a contour of the fibre compound structure that under overpressure in the pressure area the membrane essentially fills out the contour. Thus fibre layers can also be connected to highly contoured, for instance steplike surface sections by preparing accordant inversely contoured cap mats. Correspondingly through casting the mat from a master model also a lateral pressure application is possible if the mat is to be applied between stiffener profiles (as for example stringers on the inside of an aeroplane skin).

According to a preferred embodiment further a press-on assembly is provided which presses the pressure cap along with the cap mat onto the surface section. Hereby a reliable surface pressure over the surface section is achieved. Preferably the press-on assembly comprises a counter bearing for supporting on a side of the fibre compound structure which is opposed to the processed surface section, whereby a high surface pressure is achieved while the stress onto the fibre compound structure is low. Alternatively, or additionally, the press-on assembly comprises at least one suction cup for supporting on a support section of the fibre compound structure wherein said support section is adjacent to the surface section. This allows for processing a surface section of a structure which is accessible from only one side.

According to a preferred embodiment the pressure cap comprises a rigid frame on which the circumferential border is formed. This gives special stability to the pressure cap. Preferably the rigid frame is filled with a flexible cap mat. This is advantageous because in so doing a light and simply modifiable construction can be achieved.

In compliance with a preferred embodiment of the connecting device according to the present invention further a compressor for supplying the overpressure is provided. Thus external means for the generation of pressure can be dispensed with, which makes the device easy to transport and flexibly applicable.

According to a preferred embodiment further a heating element for hardening the fibre layer by warming up is provided in order that the fibre layer can be hardened at a raised temperature which is required depending on the particular resin matrix. Preferably the heating element is made of one part with the membrane for covering the fibre layer or with the cap mat in order that the heat can be generated directly adjacent to the fibre layer.

In compliance with a preferred embodiment the method according to the present invention further comprises a step of pressing the pressure cushion onto the fibre compound structure. Through this a reliable appliance of the desired surface pressure onto the whole unhardened fibre layer is achieved.

According to a preferred embodiment during further steps a low pressure area which is limited by the cap mat located above the fibre compound structure is sealed and evacuated. This is advantageous because—without requiring the placement of a separate airtight foil or membrane below the air cushion—the pressure difference between both sides of the membrane can be raised by another 0.8-0.9 bar, which allows for further raising the quality of the processing by sucking off the residual air (e.g. pores) under the cap mat and for lowering the overpressure by a corresponding value whereby for instance the pressure cap can be designed lighter and simpler.

Preferably the sealing of the low pressure area is carried out by pressing the cap mat by means of the pressure cap onto the fibre compound structure. In this way no separate sealing steps are required.

In compliance with a preferred embodiment the hardening of the at least one fibre layer is carried out by heating, for instance by means of heating elements which are embedded in the membrane or in additionally superimposed mats. Preferably the fibre layer is thereby heated according to a used resin matrix up to a temperature of 125° C. to 180° C.

According to a preferred embodiment the overpressure being applied is at least 1 bar because in so doing a bigger pressure difference between the pressure area and the area of the fibre layer is achieved than it would be possible with a vacuum bag only. Preferably the overpressure is between 1 and 2 bar what allows for a relatively simple design of the pressure cap and other components.

In the following the invention is explained in more detail by means of embodiments with reference to the accompanied figures of the drawing.

DETAILED DESCRIPTION

In the figures equal references signs identify equal or functionally equal components as far as nothing contrary is indicated.

Figure 1:
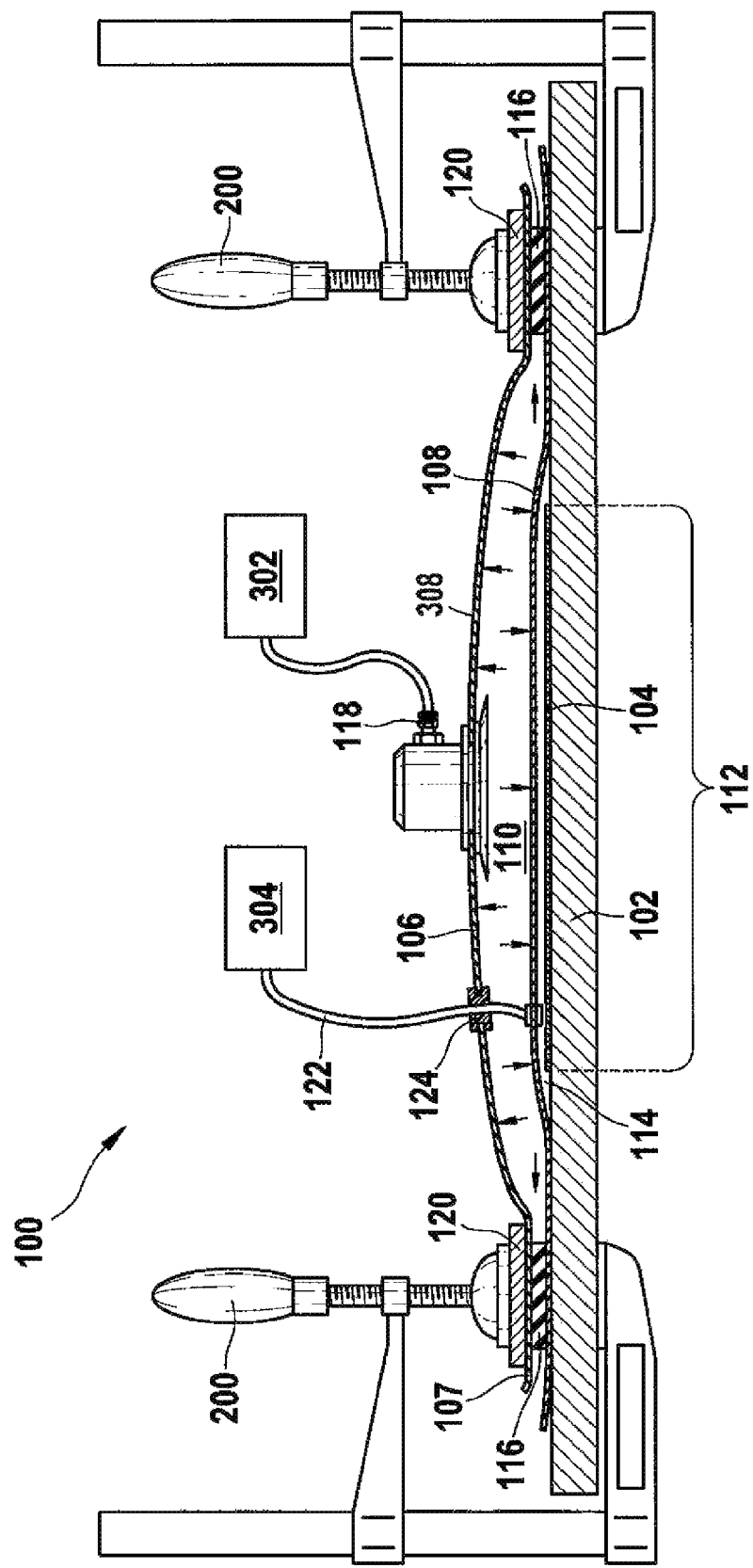
FIG. 1 a schematic cross-sectional view of a connecting device.

FIG. 1 shows a schematic cross-sectional view of a connecting device 100 in a state while connecting an initially unhardened fibre layer 104 to a fibre compound component 102. For this purpose the fibre layer 104 has been arranged on a surface section 112 and has been covered by a pressure-tight membrane (for instance a vacuum foil or a rubber mat) 108.

The membrane 108 can also be formed by a section of the hull of a vacuum bag which surrounds the fibre compound component 102 entirely.

A pressure cap 308 is arranged above the surface section 112 which is formed from a flexible cap mat 106 as for instance a rubber mat and from a rigid frame 120 which runs along the border 107 of the cap mat 106 on its upper side. Along with the border 107 of the cap mat 106 the frame 120 is pressed onto the fibre compound component 102 by screw clamps which are arranged in regular distances alongside the circumference of the frame. Furthermore, a circumferential gasket 116 is inserted between the border 107 of the cap mat 106 and the fibre compound component 102 in order that a hermetically closed pressure area 110 is formed between the cap mat 106 and the membrane 108.

However, the membrane 108 can be replaced by a vacuum bag or by a non-adhesive membrane if the gasket 116 runs on this membrane on its whole length because in this case the surface pressure of the frame 120 allows for the sealing of the overpressure area 110 as well as for the sealing of the low pressure area 114.

A valve nozzle 116 is installed in the cap mat 106 for inducing overpressure in the pressure area 110. While the device is in service initially the pressure area 110 is sealed in the described manner. Subsequently the valve nozzle 116 is connected to a compressor which is not shown and the compressor is switched on in order that an overpressure builds up in the pressure area 110.

The overpressure exerts compressive forces on the boundaries which are indicated by arrow symbols. The forces being directed against the cap mat 106 effectuates that the cap mat 106 arches up in the shown manner. The forces being directed against the membrane 108 effectuate that the membrane 108 and the fibre layer 104 being enclosed under the membrane 108 are pressed against the fibre compound component 102 whereby the fibre layer 104 is compressed.

Advantageously the section 114 which is enclosed under the membrane 108 is additionally evacuated, for instance by a vacuum pump 304, which is connected to the low pressure area 114, as shown for instance by a vacuum hose 122 which is guided through the cap mat 106 by means of a duct 124. Alternatively the vacuum hose can be conducted through at a different position, for instance close to the gasket 116 or close to the valve nozzle 118. The duct 124 can also be dispensed with, for instance if the vacuum pump 304 is provided for operation before the sealing of the pressure area 110. The evacuation of the low pressure area causes the application of an effective hardening pressure of approximately 1.8 to 2.2 bar which consists of a low pressure in the low pressure area 114 of approximately 0.8 bar compared to the atmospheric pressure and the overpressure in the pressure area 110 of approximately 1 to 2 bar.

Figure 2:
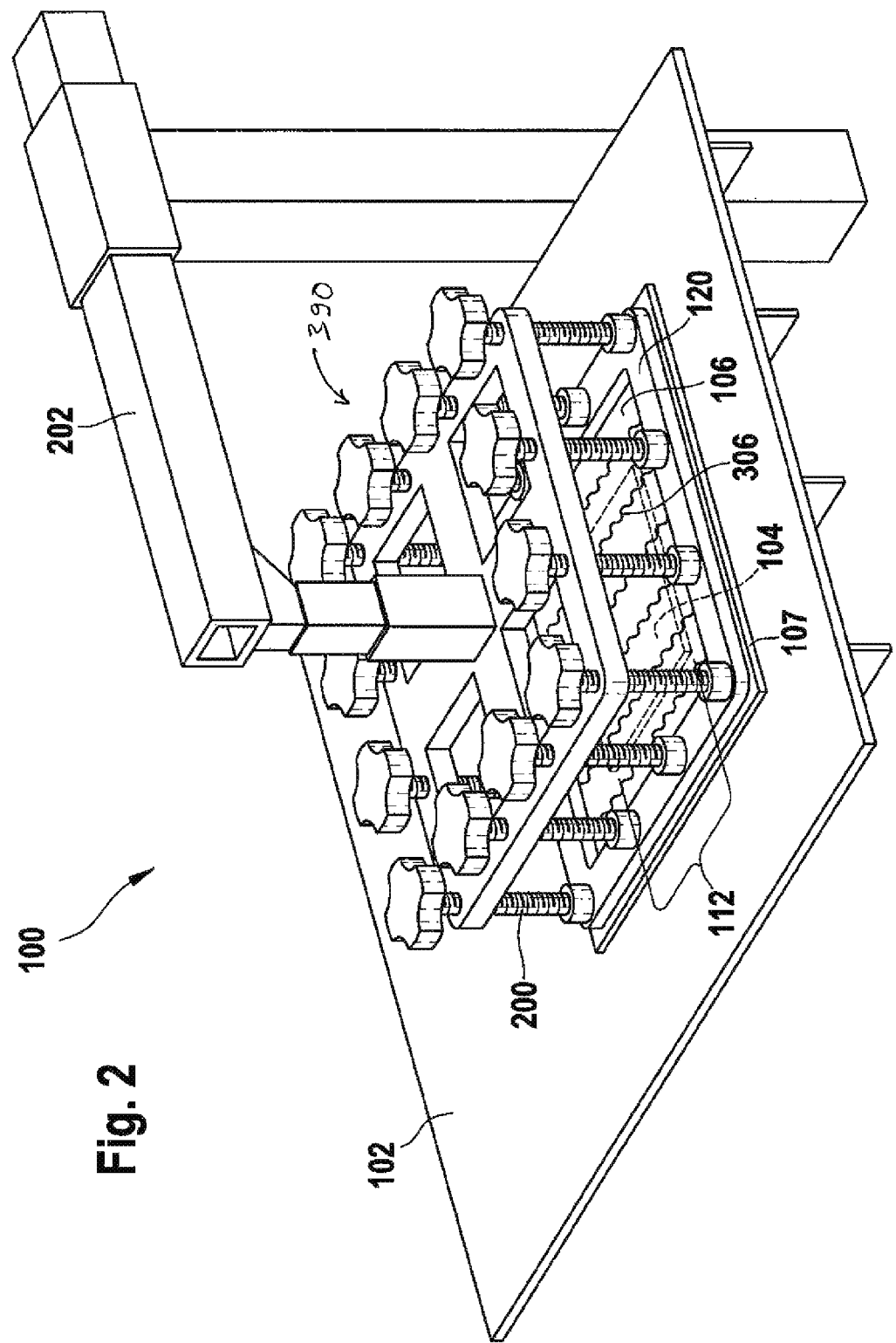
FIG. 2 a perspective oblique view of a connecting device according to a second embodiment of the invention.

FIG. 2 shows a perspective oblique view of another connecting device 100 comprising a pressure cap 308 which is arranged above a surface section 112 of a fibre compound structure 102 in the shown operating condition of the connecting device 100. Thereby the pressure cap 308 consists of a rubber cap mat 106 as cap cover and a rigid frame 120 for instance made from steel or aluminium which is pressed by a multitude of screw clamps 200 against the rubber mat 106 in order that said rubber mat is jammed between the frame 120 and the fibre compound component 102 at its border 107. For instance, the frame 120 can be firmly connected to the cap mat 106 by means of gluing; however, in the shown arrangement the pressure of the screw clamps 200 causes already a firm connection of the cap mat 106 in order that frame 120 and cap mat 106 can be formed as separate parts.

The screw clamps 200 which carry the frame 120 are held by a bar 202 which is supported on the lower side of the fibre compound structure 102 in a manner not shown here.

Figure 3:
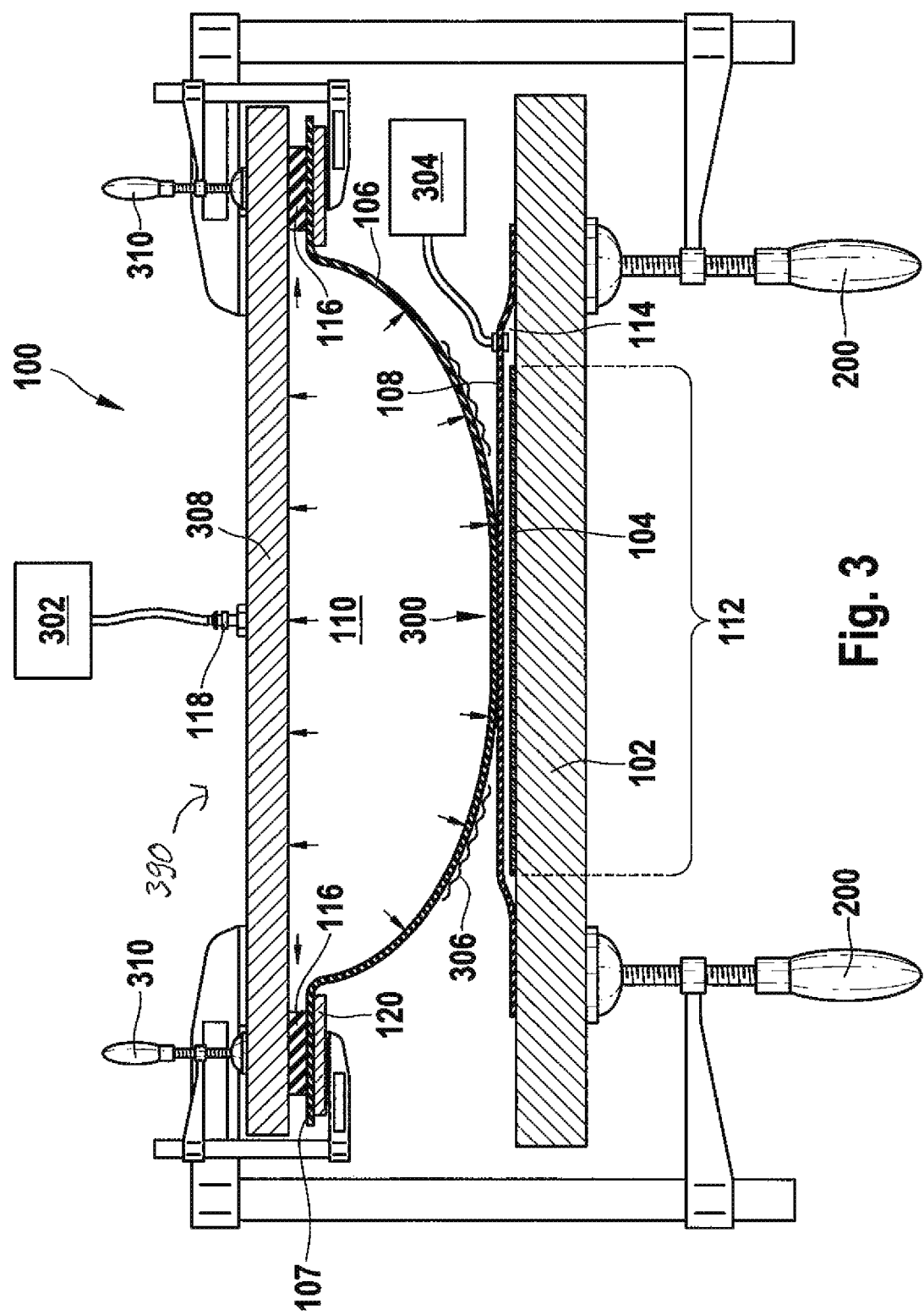
FIG. 3 a schematic cross-sectional view of a connecting device according to an embodiment of the invention.

FIG. 3 shows a schematic cross-sectional view of a connecting device according to an embodiment of the invention. In the shown operational state in line with FIG. 1 initially an unhardened fibre layer 104 has been arranged on a surface section of a fibre compound component 102 and has been covered by a membrane 108. The membrane 108 and the fibre compound element 102 enclose a low pressure room 114 lying in between which is evacuable by a vacuum pump 304.

Above the such prepared surface section of the fibre compound component 102 a pressure cushion 390 is arranged comprising a rigid pressure cap 308 on the bottom side of which a cap mat 106 is connected by means of fastening elements 310, a circumferential gasket 116 and a frame 120, such that said cap mat encloses a hermetically closed and permanently fixed pressure area 110 inside the pressure cushion 390 along with the plate of the pressure cap 308. An overpressure can be applied to the pressure area 110 by means of a compressor 302 via a pressure induction nozzle 118. Electric heating elements 306 are arranged on the outside or inside of the cap mat 106 or embedded in the cap mat 106. They allow for heating the fibre layers 104 for hardening.

During the operation of the device 100 the low pressure area 114 is evacuated by the vacuum pump 304. In the pressure area 110 an overpressure being indicated by arrow symbols is built up by means of the compressor 302 which inflates the cap mat 106. If the screw clamps 200 (or other devices as for instance pressure spindles or pressure cylinders which serve the purpose) are adjusted in a suitable manner the overpressure presses the cap mat 106 against the fibre layer 104 which is covered by the membrane 108 and compresses the fibre layer. The heating elements 306 are activated for the final hardening of the fibre layers 104.

Figure 3A:
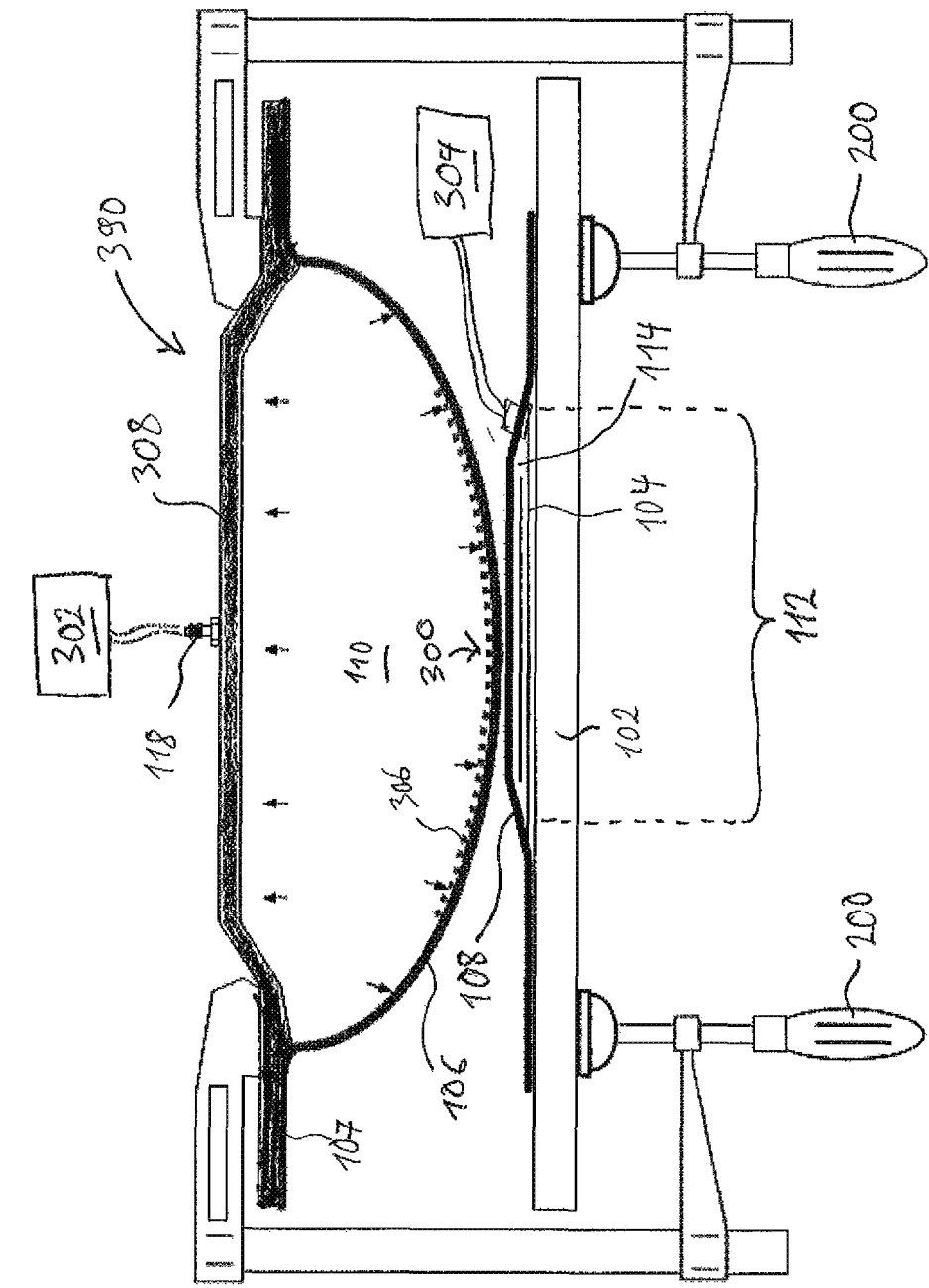
FIG. 3A a schematic cross-sectional view of a connecting device according to an embodiment of the invention.

FIG. 3A shows view of a connecting device according to a further embodiment, which differs from the embodiment of FIG. 3 in that the pressure cap 308 and the cap mat 106 have been integrally formed from an elastic material such as rubber. In other words, the pressure cushion 390 that contains the pressure area 110 is formed as a single piece, which reduces the cost of providing the connecting device and greatly facilitates handling. The pressure cushion 390 can be formed such that it exhibits the form of a flat, hollow mat in a state when it is not in use and the pressure area 110, located inside this hollow mat, is deflated, thus allowing efficient storage of the pressure cushion 390.

Figure 3B:
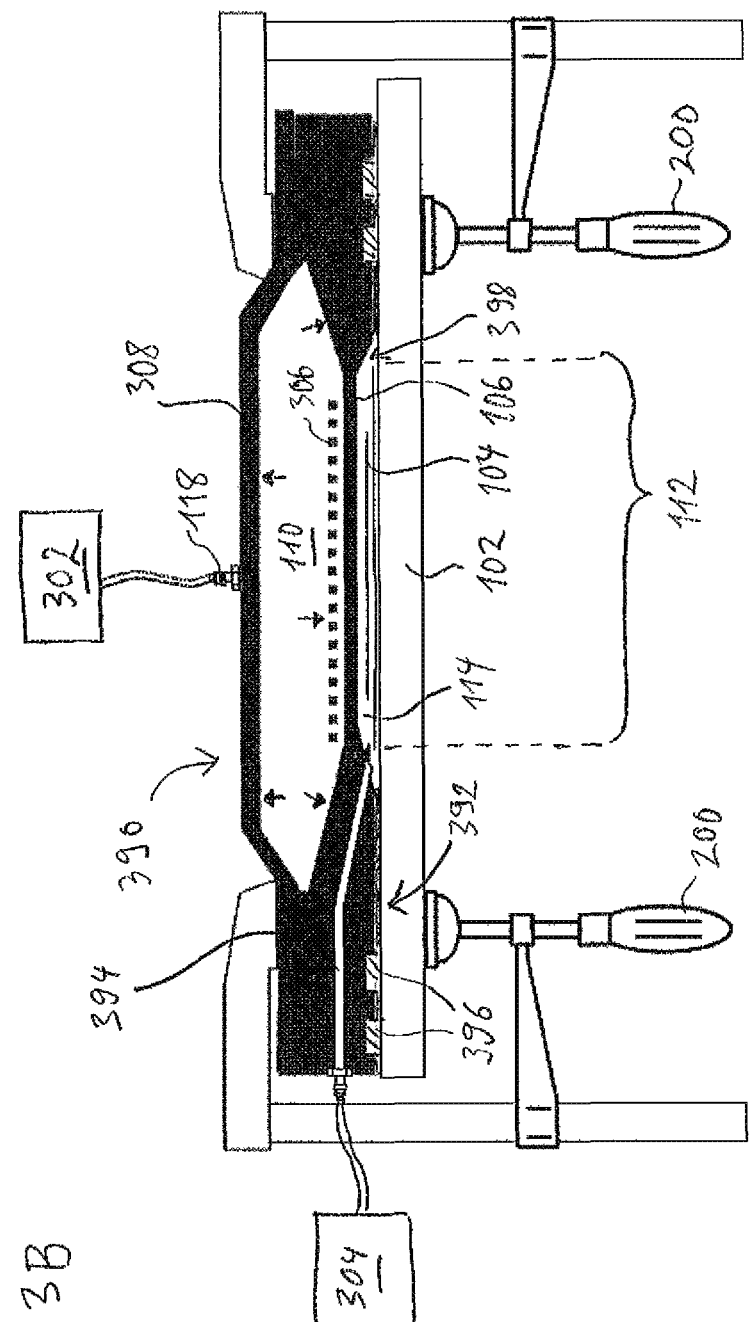
FIG. 3B a schematic cross-sectional view of a connecting device according to an embodiment of the invention.

FIG. 3B shows a view of a connecting device according to a further embodiment, in which as in the embodiment of FIG. 3A the pressure cushion 390 comprising the pressure cap 308 and the cap mat 106 has been integrally formed from an elastic material such as rubber. In addition, the pressure cushion 390 comprises a sealing area 392 that during use of the connecting device touches the fibre compound structure 102 along a circumference enclosing the surface section 112. Due to the presence of the sealing area 392, a low pressure area 114 can be formed at the location of the fibre layer 104 without having to separately provide a pressure-tight membrane for covering the surface area 112. At the location where the low-pressure area 114 is to be formed, the pressure cushion comprises a shallow recess 398. An evacuation duct 394 runs from the low-pressure area 114 to the circumference of the pressure cushion 390, thus allowing the low-pressure area 114 to be evacuated by a vacuum pump 304 after the pressure cushion 390 has been pressed onto the fibre compound structure 102. For improved sealing performance, gaskets 396 e.g. from a softer material that run around the circumference enclosing the surface section 112 have been provided in the sealing area.

Figure 4:
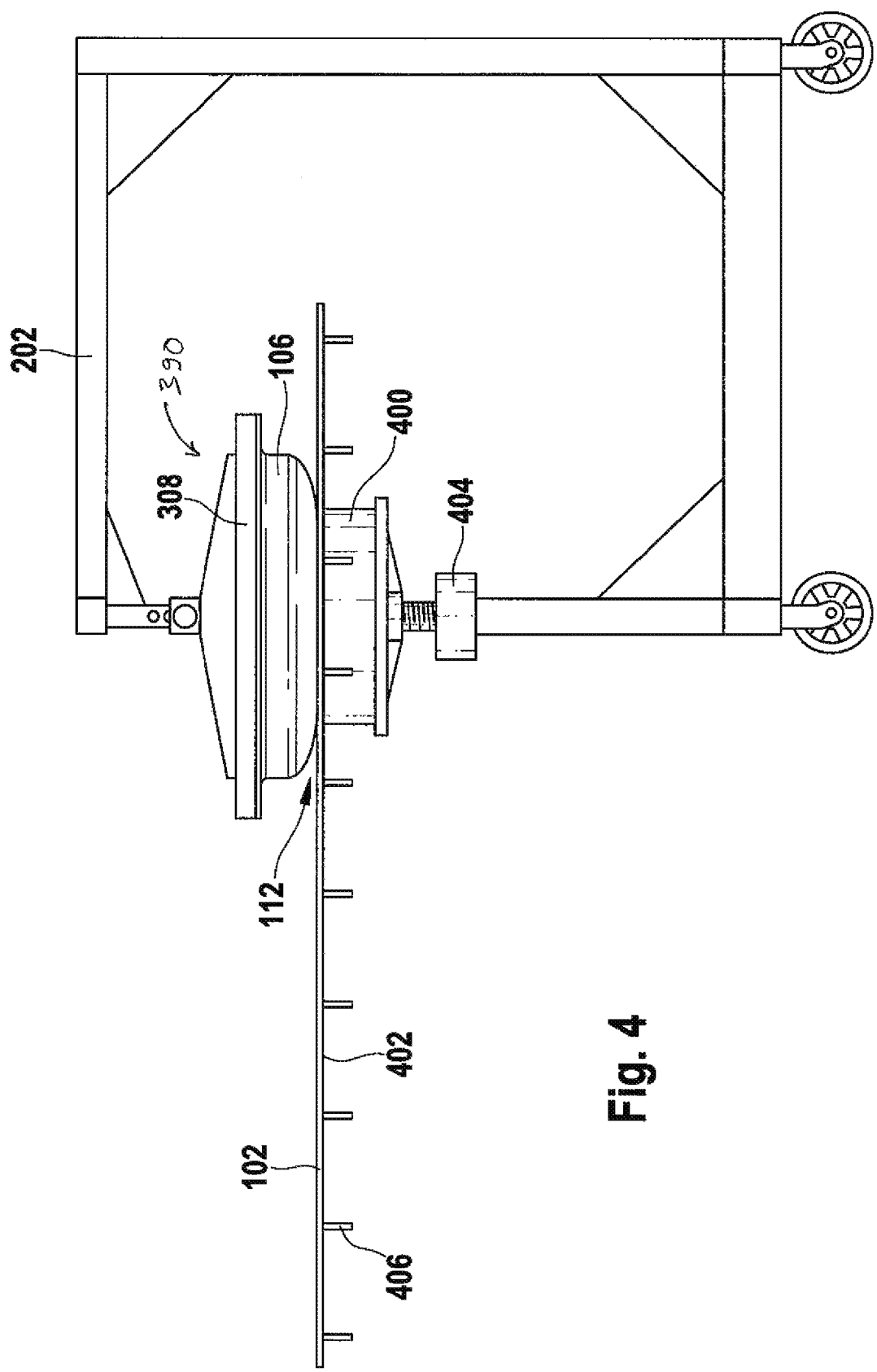
FIG. 4 a side view of a connecting device according to an embodiment of the invention.

FIG. 4 shows a side view of a connecting device according to an embodiment of the invention in which a cap mat 106 (in line with FIG. 3) is permanently connected to a pressure cap 308 constituting an integral pressure cushion 390 and being supported by a bar 202. The bar 202 allows for pressing the pressure cap 308 along with the cap mat 106 onto a surface section 112 of a fibre compound structure 102 which is to be processed so as to indirectly apply the overpressure prevailing between the pressure cap 308 and the cap mat 106 to the surface section by this means.

The bar 202 has a C-shaped form and has a counter bearing 400 on the other end which has a profile which is suitable for supporting the fibre compound structure 102 on a back side 402 which is opposed to the surface section 112 to be processed. The exemplary shown fibre compound structure 102 has a multitude of stringers 406 on its back side which fit into according cavities of the counter bearing 400. A height adjustment 404 allows for adapting the height of the counter bearing to the thickness of the fibre compound structure 102 and for adapting the desired surface pressure of the cap mat 106.

In a similar manner as the counter bearing 400 the cap mat 106 can also be designed in a contoured manner according to the shape of the surface section 112 to be processed so as to improve the pressure distribution and to optimally use the strechability of the cap mat 106. A such contoured cap mat 106 can be produced for instance on an accordingly shaped master pattern.

Figure 5:
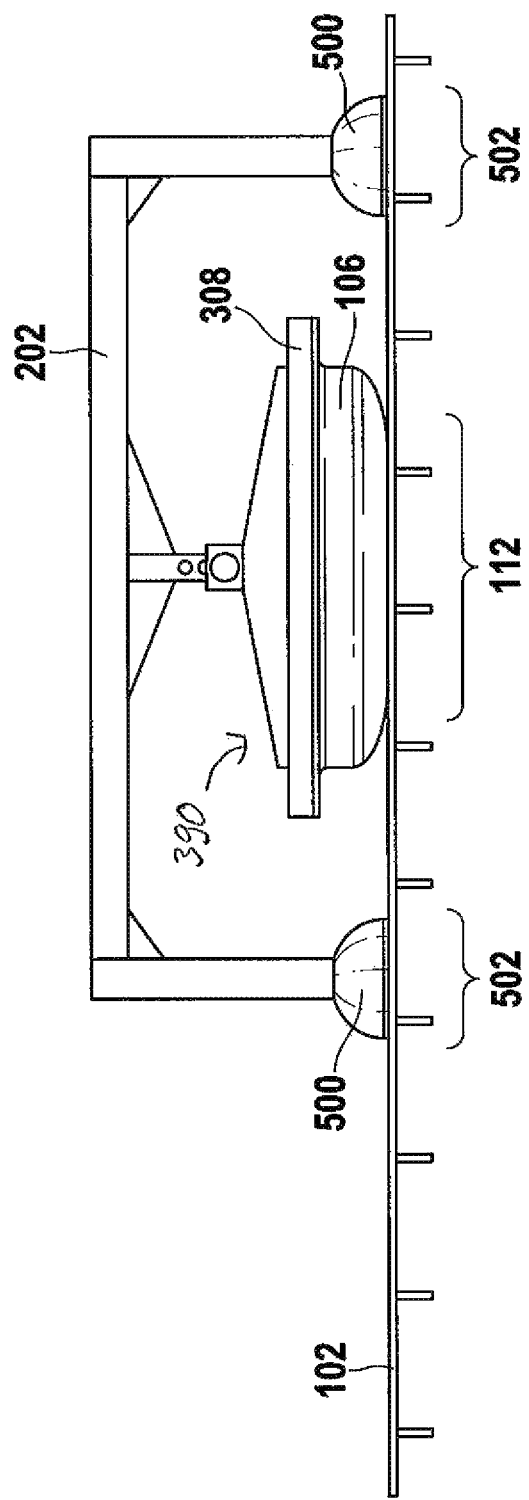
FIG. 5 a side view of a connecting device according to an embodiment of the invention.

FIG. 5 shows a side view of a connecting device according to an embodiment of the invention which also comprises a pressure cushion 390 constituted as an integral unit from a pressure cup 308 and from a cap mat 106 and which is held by a bar 202 above the surface section 112 of a fibre compound structure 102 to be processed. However, in this embodiment the bar 202 is supported by means of suction cups 500 on supporting sections 502 of the surface of the fibre compound structure 102 which are adjacent to the surface section 112 that is to be processed.

Figure 6:
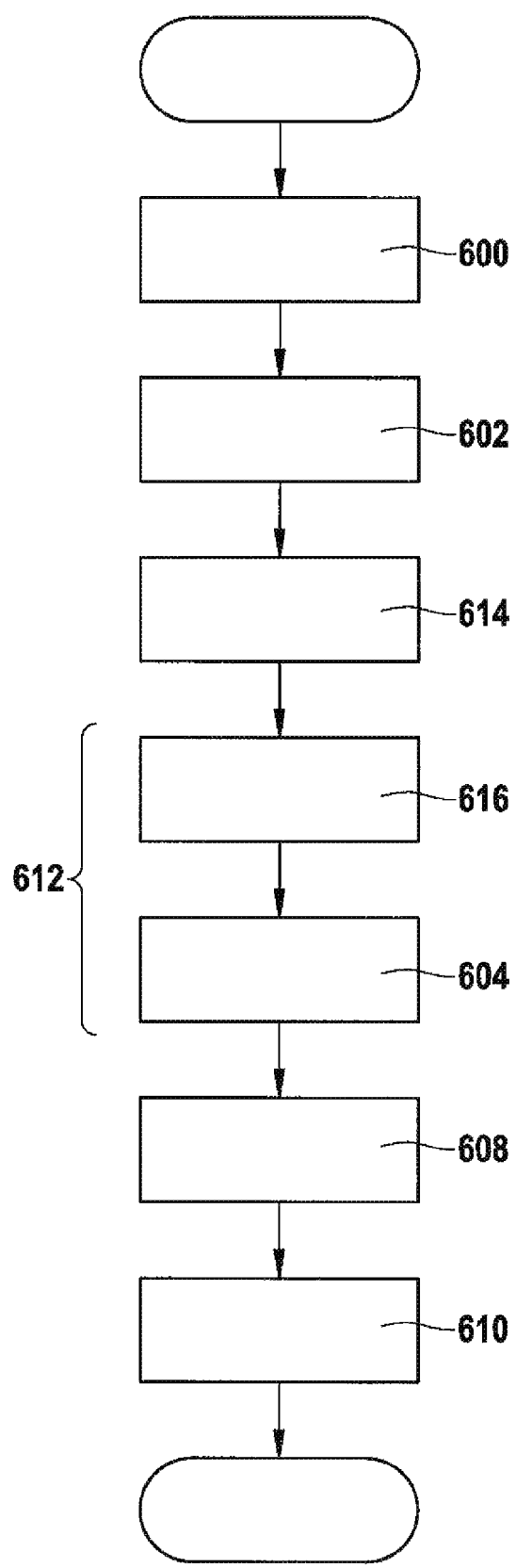
FIG. 6 a flowchart of a processing method according to an embodiment of the invention.

FIG. 6 shows a flow chart of a processing method for processing a fibre compound structure according to an embodiment of the invention which can be carried out for instance by means of one of the above described connecting devices.

Thereby in a first step 600 the unhardened fibre layers are arranged on a surface section of the fibre compound structure. Subsequently, in a further step 602 the fibre layers are covered by a pressure tight membrane for instance by a single serving vacuum foil or by a reusable rubber mat. In a step 614 a low pressure area which is bounded by the membrane and by the fibre compound structure is sealed. Subsequently, the low pressure area is evacuated in a step 616.

In a further step 604 a pressure cushion is arranged above the surface section, which comprises a pressure cap and a pressure tight cap mat connected pressure tightly to a circumferential border of the pressure cap such that the cap mat limits a pressure area together with the pressure cap. The arranging of the pressure cap 604 and of the membrane 602 is carried out in such a manner that the pressure cap is pressed against the fibre compound structure so that partial areas of the pressure cap or of the cap mat like the border of the pressure cap or the centre of the cap mat press against the fibre compound structure.

In a further step 608 an overpressure is generated in the pressure area which presses the membrane against the fibre layers. The step 606 and farther 608 can also be carried out at the beginning of the method, for instance by prefilling the pressure cushion with a pressure medium as compressed air.

The arranging of the pressure cap 604 and the generating 608 of the overpressure cooperate to that effect that the pressure cap together with the cap mat is pressed onto the fibre compound structure 612 which is covered by the membrane so that partial sections of the cap mat as the centre of the cap mat press against the fibre compound structure.

An evacuation of the low pressure area in step 616 and the generation of the overpressure result in the application of an effective hardening pressure of approximately 1.8 to 2.8 bar which is composed of a low pressure in the low pressure area of approximately 0.8 bar compared to the atmospheric pressure and of the overpressure in the pressure area of approximately 1 to 2 bar.

As an alternative to steps 602 and 614, the low pressure area may be sealed together with step 608 by pressing a sealing area provided on the cap mat against the fibre compound structure, such that the resulting low pressure area is bounded by the cap mat and the fibre compound structure. In this case, step 616 may also be performed after step 608.

In a terminal step 610 the fibre layers are hardened, for instance by heating by means of heating elements which can be integrated in the membrane or in the cap mat or can be attached to these.

Although the present invention has been described by means of preferred embodiments it is not restricted thereto, but it is modifiable in a versatile fashion.

For instance, unhardened fibre layers can also be connected to structures and components of a different type. Thus, it is possible to connect layers of fibre glass reinforced plastic to components of aluminium in the described manner. Furthermore, the fibre layers can be replaced by materials of a different type as for instance granulates. Also connecting of a hard element to the basic structure by means of an inlaid adhesive film layer is possible.

LIST OF REFERENCE SIGNS 100 connecting device
102 fibre compound structure
104 fibre layer
106 cap mat
107 border
108 pressure tight membrane
110 pressure area
112 surface section
114 low pressure area
116 gasket
118 valve nozzle
120 frame
200 screw clamps
202 bar
300 middle section
302 compressor
304 vacuum pump
306 heating element
308 cap plate
310 fastening element
390 pressure cushion
392 sealing area
394 evacuation duct
396 gasket
398 recess
400 counter bearing
402 back side
404 height adjustment
406 stringer
500 vacuum cup
502 support section
600 arranging of the fibre layers
602 covering of the fibre layers
604 arranging of the pressure cap
608 generating an overpressure
610 hardening of the fibre layers
612 pressing on of the pressure cap

What is claimed is:

1. A processing method for processing a fibre compound structure, the method comprising:
arranging at least one unhardened fibre layer on a surface section of the fibre compound structure;
arranging a pressure cushion above the surface section, the pressure cushion comprising a pressure cap and a pressure-tight cap mat being pressure-tightly connected to a circumferential border of the pressure cap such that the cap mat limits a pressure area together with the pressure cap;
supporting a side of the fibre compound opposed to the surface section with a counter bearing surface;
generating an overpressure in the pressure area;
pressing the pressure cushion onto the fibre compound structure such that the overpressure presses the cap mat against the at least one fibre layer while supporting the fibre compound structure on a side of the fibre compound structure that is opposed to the surface section; and
hardening the at least one fibre layer,
wherein the pressure-tight cap mat fills out contours and/or step like sections according to a contour of the fibre compound structure.

2. The processing method according to claim 1, wherein the method further comprises the steps of:
covering the at least one fibre layer by the cap mat; sealing of a low-pressuer area limited by the cap mat and the fibre compound structure; and
evacuating of the low-pressure area.

3. The processing method according to claim 2, wherein the sealing of the low pressure area is carried out by pressing the cap mat by means of the pressure cap onto the fibre compound structure.

4. The processing method according to claim 1, wherein the hardening of the at least one fibre layer is carried out by heating, in particular up to a temperature of 125 C to 180 C, in accordance with a resin matrix of the fibre layer.

5. The processing method according to claim 1, where the overpressure being applied is at least 1 bar above atmospheric pressure.

* * * * *